United States Patent [19]
Mahoney et al.

[11] Patent Number: 5,263,640
[45] Date of Patent: Nov. 23, 1993

[54] METHOD OF BRAZING BERYLLIUM-ALUMINUM ALLOYS

[75] Inventors: Murray W. Mahoney, Camarillo; William H. Bingel, Simi Valley; Michael Calabrese, Newbury Park, all of Calif.

[73] Assignee: Rockwell International Corporation, Seal Beach, Calif.

[21] Appl. No.: 957,584

[22] Filed: Oct. 7, 1992

[51] Int. Cl.$^5$ ............................................. B23K 31/02
[52] U.S. Cl. .................................. 228/190; 228/206; 228/252; 427/309
[58] Field of Search ............... 228/190, 206, 252, 211; 427/309

[56] References Cited

U.S. PATENT DOCUMENTS

| | | | |
|---|---|---|---|
| 2,169,098 | 8/1939 | Howe | 228/206 |
| 3,093,503 | 6/1963 | Laszlo | 427/309 |
| 3,555,666 | 1/1971 | Rhee | 228/206 |
| 3,978,253 | 8/1976 | Sahm | 427/309 |
| 4,260,441 | 4/1981 | Prewo | 228/190 |
| 4,732,314 | 3/1988 | Sakamoto | 228/190 |

Primary Examiner—Mark Rosenbaum
Assistant Examiner—Jeffrey T. Knapp
Attorney, Agent, or Firm—John C. McFarren

[57] ABSTRACT

A method is provided for joining Be-Al alloy structural members to yield a high shear strength at the interface. Surface oxides are first removed from the Be-Al alloy members. Aluminum is then selectively etched from the bonding surfaces to allow the flow of braze alloy into high aspect ratio capillary sites. A discontinuous ceramic reinforcing material, such as $Al_2O_3$ or SiC in particulate or whisker form, is added in small quantities to a braze foil, such as Al-Si, to create a composite at the bond interface. The braze foil and reinforcing material are sandwiched between the Be-Al alloy members, and the joint is heated to above the liquidus temperature of the braze alloy but below the melting point of aluminum. The resulting interface shear strength of the Be-Al alloy bond has been tested to an average of about 60% of the parent alloy shear strength.

13 Claims, 1 Drawing Sheet

METHOD OF BRAZING BERYLLIUM-ALUMINUM ALLOYS

GOVERNMENT RIGHTS

The United States Government has rights in this invention under contract number F33657-87-C-2214 awarded by the Department of the Air Force.

TECHNICAL FIELD

The present invention relates to methods of bonding metallic alloys and, in particular, to a brazing process for bonding high modulus, low density beryllium-aluminum alloys.

BACKGROUND OF THE INVENTION

Beryllium-aluminum (Be-Al) alloys are typically high modulus, low density alloys containing high levels of aluminum. For example, the most common Be-Al alloy, Lockalloy, a trademark of the Lockheed Corporation, comprises 62Be-38Al weight percent. Be-Al alloys were developed to combine the ductile properties of aluminum with the higher strength properties of beryllium. The specific light weight, high strength properties of Be-Al alloys make them particularly useful in applications where weight reduction provides significant cost benefits.

Metallic alloys that have tenacious oxides are difficult to join using conventional bonding methods. Be-Al alloys such as Lockalloy are particularly difficult to bond because of the oxides associated with both aluminum and beryllium. Furthermore, the bonding temperature for Be-Al alloys is limited because of the low melting point of aluminum, which remains separate from the beryllium because of low solubility of the elements. An Al-Si braze alloy, having a melting point of approximately 570° C., is typically used for bonding aluminum alloys. When Al-Si braze alloy is used to bond Be-Al alloys, however, shear strengths of only about 25% of the parent alloy are achieved. Therefore, a need exists for a method of bonding Be-Al alloys with improved interface shear strength over that achieved by conventional brazing techniques.

SUMMARY OF THE INVENTION

The present invention comprise a method of joining Be-Al alloy structural members to yield a high shear strength at the interface. The method uses a selective etching procedure and the addition of a discontinuous reinforcement at the bond surface. As a first step, surface oxides are removed from the Be-Al alloy members to be joined. Aluminum is then selectively etched from the Be-Al alloy bonding surfaces to allow the flow of braze alloy into high aspect ratio capillary sites. A reinforcing material, such as $Al_2O_3$ or SiC in particulate or whisker form, is added in small quantities to a braze foil, such as Al-Si foil, to create a composite at the bond interface. The braze foil and reinforcing material are sandwiched between the Be-Al alloy members, and the joint is heated to above the liquidus temperature of the braze alloy but below the melting point of aluminum. The resulting interface shear strength of the Be-Al alloy bond of the present invention has been tested to an average of about 60% of the parent alloy shear strength. This is more than twice the shear strength of a conventional braze. Furthermore, the reinforced braze interface of the present invention maintains high strength at temperatures over 300° F. while the strength of a conventional braze decreases rapidly with increasing temperature.

A principal object of the invention is to join Be-Al alloy structural members with a high shear strength bond. Features of the invention include a selective Be-Al alloy etching procedure and the addition of a discontinuous reinforcement at the bond surface. An advantage of the invention is a high shear strength Be-Al alloy bond that maintains interface strength from cryogenic to moderately elevated temperatures.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENT

Figure 1:
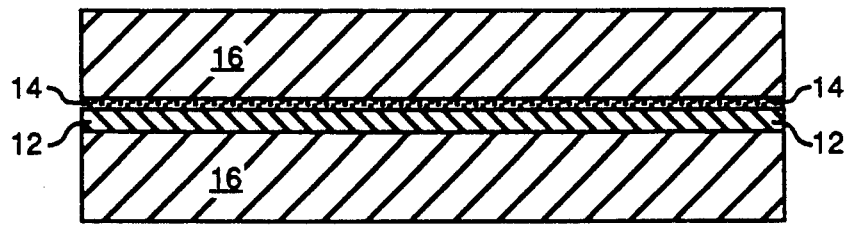
FIG. 1 is a schematic diagram of a braze alloy foil and reinforcing material sandwiched between two Be-Al alloy members to be joined by the method of the present invention.
Figure 2:
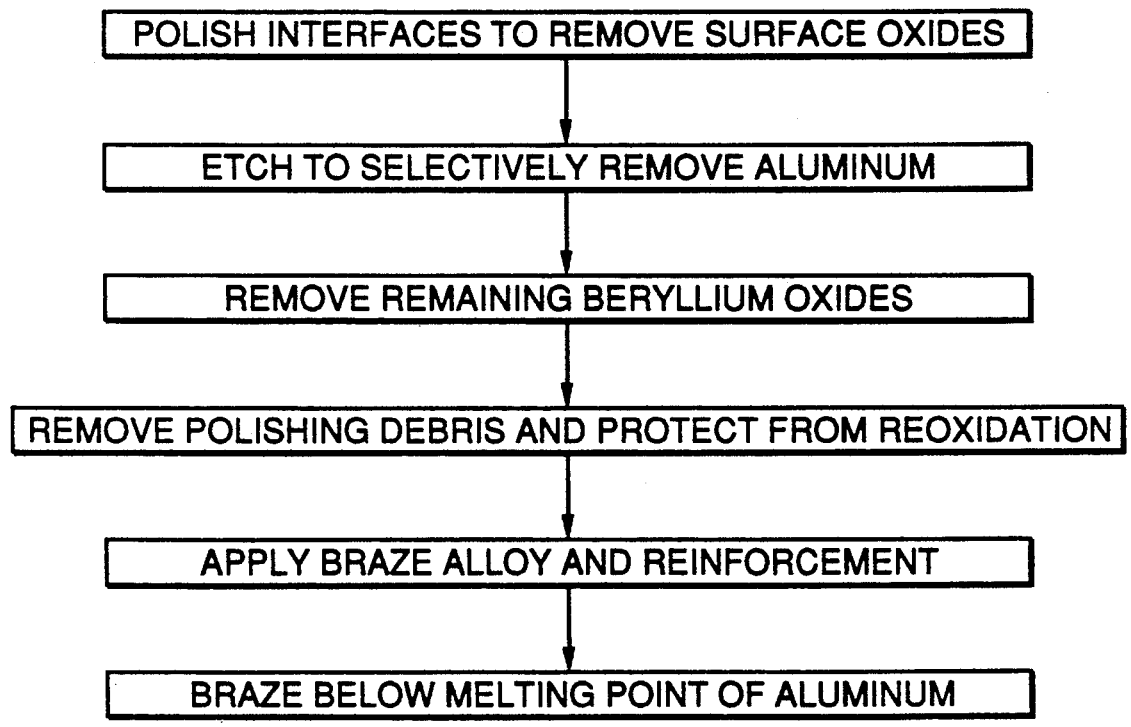
FIG. 2 is a block diagram illustrating the major steps in the present method of bonding Be-Al alloy structural members with a reinforced braze alloy.

Be-Al alloys generally comprise high modulus, low density alloys that contain high levels of aluminum. For example, Lockalloy, a trademark of the Lockheed Corporation, is a common Be-Al alloy comprising 62Be-38Al weight percent. Be-Al alloys combine the ductile properties of aluminum with the higher strength of beryllium, and are useful in applications where weight reduction is an important consideration. The present invention comprises a method of joining structural members of Be-Al alloy that are difficult to bond because of the oxides associated with both aluminum and beryllium. As illustrated schematically in FIG. 1, the process of the present invention employs a brazing foil 12 and reinforcing material 14 sandwiched between Be-Al alloy members 16 that are to be bonded together. The basic steps of the brazing process of the present invention are outlined in the block diagram of FIG. 2.

The first step in the process is the removal of surface oxides from the Be-Al alloy members 16 to be joined. The bonding surfaces of Be-Al alloy members 16 may be ground or polished, with 600 grit paper, for example, to remove most of the surface oxides. After polishing, the bonding surfaces are exposed to or immersed in a selective etching reagent, such as concentrated NaOH, for example, to further remove surface oxides and to selectively etch the aluminum phase of the alloy to a specified depth without attacking the beryllium phase. The non-bonding surfaces of Be-Al alloy members 16 are generally masked to avoid unwanted exposure to the reagent and subsequent depletion of aluminum. Selective etching of aluminum to a depth of approximately 5 to 10 microns creates high aspect ratio capillary channels in the bonding surfaces. After etching the aluminum phase, any remaining surface oxides of beryllium may be removed using an acid bath of $H_2O$-$HNO_3$-HF, for example. As a final surface preparation step, Be-Al alloy members 16 may be ultrasonically cleaned and stored in dehydrated alcohol to remove any polishing debris and to protect the bonding surfaces from reoxidation.

A thin brazing alloy foil 12, such as 0.001" thick Al-Si foil, for example, is placed between the bonding surfaces of Be-Al alloy members 16. A layer 14 of reinforcing material is also placed between members 16. The reinforcing material of layer 14 may comprise a discontinuous ceramic material, such as alumina (Al$_2$O$_3$) or silicon carbide (SiC) in particulate or whisker form, for example. A layer 14 of very fine SiC particulate (less than approximately 5 microns) has been tested satisfactorily at a reinforcement-to-foil volume ratio of approximately 5 to 15 percent. When used with SiC reinforcing material 14, brazing foil 12 should have some Si content to retard reaction of liquid Al with the SiC material. Layer 14 may be applied, for example, by spraying reinforcing particulate or whiskers suspended in an alcohol binder onto brazing alloy foil 12. However, any method of applying a thin, uniform layer 14 of reinforcing material, such as manufacturing foil 12 in combination with reinforcing material 14, would be acceptable.

In preparation for brazing, brazing foil 12 and reinforcing material 14 are sandwiched between Be-Al alloy members 16 to form a brazing assembly. Depending on the particular braze alloy and reinforcing material, the sandwiched assembly may be placed under a load and/or in a vacuum for brazing. Actual brazing with Al-Si foil reinforced with SiC particulate was performed at a load of about 300–450 psi in a vacuum. Brazing at atmospheric pressure is anticipated to be acceptable and would simplify the process considerably. The sandwiched assembly is heated to above the liquidus temperature of the braze alloy but below the melting point of the aluminum phase of Be-Al alloy members 16. Using Al-Si braze alloy, the assembly was heated to approximately 620°–630° C. for 10 minutes.

When heated, the braze alloy of layer 12 wets and flows into the capillary channels that were formed during etching of the Be-Al alloy bonding surfaces. This creates a mechanical locking bond. The reinforcing material of layer 14 remains concentrated but uniformly dispersed at the bond interface to reinforce braze alloy 12 and disrupt the otherwise continuous morphology of the braze. Photomicrographs of cross-sections of Lockalloy samples brazed by the method of the present invention show reinforcing material dispersed uniformly throughout the bond interface, resulting in a strengthening of the weak, monolithic Al-Si braze alloy.

TEST RESULTS

Samples of Lockalloy bonds were tested for shear strength using a test fixture that allowed single point loading. The test fixture was made of stainless steel having the same coefficient of thermal expansion as the brazed Lockalloy samples. The test fixture and sample were placed between parallel platens in an Instron tester and loaded to failure at a constant crosshead rate of 0.05 in/min.

Table 1 below shows an average shear strength of approximately 12,100 psi at room temperature for Lockalloy samples bonded using the reinforced braze method of the present invention. At −320° F. the average shear strength was about 12,900 psi and at 300° F. the average shear strength was about 10,900 psi. Additional tests showed that at the higher temperatures shear strength decreases rapidly with an increase in braze foil thickness above 0.001"'.

TABLE 1

| Interface Shear Strength Of Brazed Lockalloy (78° F.) | |
|---|---|
| Braze Parameters | Shear Stress (1000 psi) |
| Lockalloy base alloy (not brazed) | ≈20.0 |
| 0.001" Al—Si braze alloy (conventional braze) | 5.7 |
| 0.001" Al—Si braze alloy with NaOH etch | 9.5 |
| 0.001" Al—Si braze alloy with SiC particulate | 9.7 |
| 0.001" Al—Si braze alloy with NaOH etch and SiC particulate | 12.1 |
| 0.001" Al—Si braze alloy with NaOH etch and SiC whiskers | 12.3 |
| 0.0025" Al—Si braze alloy with NaOH etch and SiC particulate | 12.0 |

The reinforced brazing method of the present invention has been shown to provide an improvement in shear strength for bonded Be-Al alloy structural members. The preferred embodiment of the present method adds two steps to conventional vacuum brazing techniques: a selective etch that removes aluminum from the Be-Al alloy bonding surface to controlled depths, and the addition of discontinuous ceramic reinforcing material to strengthen the braze alloy. Although the best mode presently known for practicing the invention has been described above, the process has not been optimized. It is expected that variations in the process parameters, including depth of Al removal, braze foil material and thickness, volume ratio and type of reinforcement, and techniques for applying thin layers of reinforced braze alloy, will be evaluated to obtain the maximum interface strength possible for bonded Be-Al alloy.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A method of brazing Be-Al alloy members, comprising the steps of:
   polishing bonding surfaces of the alloy members to remove surface oxides;
   selectively etching aluminum at said bonding surfaces;
   exposing said bonding surfaces to an acid bath to remove remaining oxides of beryllium;
   cleaning and storing the Be-Al members in dehydrated alcohol to prevent reoxidation of said bonding surfaces;
   forming a bonding assembly by placing a brazing alloy foil between said bonding surfaces; and
   heating said assembly to melt said brazing alloy and braze said bonding surfaces of the Be-Al alloy members.

2. The method of claim 1, wherein the step of selectively etching aluminum comprises exposing said bonding surfaces to NaOH for etching aluminum to a predetermined depth.

3. The method of claim 1, wherein the step of forming said bonding assembly further comprises placing a thin layer of discontinuous ceramic reinforcing material between said bonding surfaces with said brazing alloy foil.

4. The method of claim 3, wherein the step of forming said assembly further comprises placing an Al-Si brazing alloy foil and a thin layer of SiC reinforcing material between said surfaces to be joined.

5. A method of brazing Be-Al alloy members, comprising the steps of:
   polishing bonding surfaces of the alloy members to remove surface oxides;
   exposing said bonding surfaces to an acid bath to remove remaining oxides of beryllium;
   cleaning and storing the Be-Al members in dehydrated alcohol to prevent reoxidation of said bonding surfaces;
   forming a bonding assembly by placing a brazing alloy foil and a thin layer of discontinuous ceramic reinforcing material between said bonding surfaces; and
   heating said assembly to melt said brazing alloy and join said bonding surfaces of the Be-Al alloy members with a reinforced braze.

6. The method of claim 5, further comprising the step of selectively etching aluminum at said bonding surface before forming said bonding assembly.

7. The method of claim 6, wherein the step of selectively etching aluminum comprises exposing said bonding surfaces to NaOH for etching aluminum to a predetermined depth.

8. The method of claim 7, wherein the step forming said bonding assembly further comprises placing an Al-Si brazing alloy foil and a thin layer of SiC reinforcing material between said bonding surfaces.

9. A method of joining Be-Al alloy members, comprising the steps of:
   polishing the bonding surfaces of the Be-Al alloy members to remove surface oxides;
   selectively etching said polished surfaces to remove aluminum to a predetermined depth;
   cleaning and protecting said etched surfaces from reoxidation;
   forming a bonding assembly by placing a brazing alloy foil and a reinforcing material between said bonding surfaces; and
   heating said assembly to melt said brazing alloy and form a reinforced braze joining said bonding surfaces of the Be-Al alloy members.

10. The method of claim 9, wherein cleaning and protecting said etched surfaces comprises the steps of:
    exposing said bonding surfaces to an acid bath to remove remaining oxides of beryllium after the step of selectively etching aluminum; and
    cleaning and storing the Be-Al members in dehydrated alcohol to prevent reoxidation.

11. The method of claim 10, wherein the step of selectively etching aluminum comprises exposing said bonding surfaces to NaOH for etching aluminum to a predetermined depth.

12. The method of claim 11, wherein the step of forming said bonding assembly further comprises placing a thin layer of discontinuous ceramic reinforcing material between said bonding surfaces with said brazing alloy foil.

13. The method of claim 11, wherein the step of forming said bonding assembly further comprises placing an Al-Si brazing alloy foil and a thin layer of SiC reinforcing material between said bonding surfaces.

* * * * *